United States Patent [19]
Downs

[11] Patent Number: 6,148,251
[45] Date of Patent: Nov. 14, 2000

[54] TOUCHTONE ELECTRONIC STEERING WHEEL

[75] Inventor: Stuart G. Downs, San Diego, Calif.

[73] Assignee: TRW Inc., Redondo Beach, Calif.

[21] Appl. No.: 09/228,591

[22] Filed: Jan. 12, 1999

[51] Int. Cl.[7] ................................................... G06F 7/00
[52] U.S. Cl. ........................................... 701/36; 307/10.1
[58] Field of Search .................... 701/36, 49; 340/456, 340/22, 54; 180/178; 307/10.1; 200/5 R; 359/144

[56] References Cited

U.S. PATENT DOCUMENTS

| | | | |
|---|---|---|---|
| 4,884,057 | 11/1989 | Leorat | 340/456 |
| 5,335,743 | 8/1994 | Gillbrand et al. | 180/178 |
| 5,695,020 | 12/1997 | Nishimura | 180/169 |
| 5,739,491 | 4/1998 | Crosson, Jr. | 200/61.54 |
| 5,833,025 | 11/1998 | Bhandari | 180/178 |
| 6,064,932 | 5/2000 | Francois | 701/49 |

*Primary Examiner*—William A. Cuchlinski, Jr.
*Assistant Examiner*—Tuan To
*Attorney, Agent, or Firm*—Michael S. Yatsko

[57] ABSTRACT

A steering wheel control system (10) that employs a method for passing push-button commands from a steering wheel to a vehicle system where the method is not dependant upon the contact resistance of a sliding contact (32) located in the steering wheel column. The control system (10) uses a steering wheel electronics assembly (20) to generate tones corresponding to the commands, a signal transmission assembly (30) to transmit the tones from the electronics assembly (20) to an electronic control box (40) located elsewhere in the vehicle, and the electronic control box (40) to decode the transmitted tone. The use of discrete frequencies avoids operational problems associated with decreases in the overall system noise margin due to large voltage drops across the sliding contact (32). Furthermore, the use of off-the-shelf tone generation and decoding components allows for an (overall reduction in system cost and increase in system reliability.

20 Claims, 1 Drawing Sheet

TOUCHTONE ELECTRONIC STEERING WHEEL

CROSS-REFERENCE TO RELATED APPLICATION

This application is related to one commonly assigned application entitled: "Electronic Steering Wheel Technique For Passing Information With A Programmahble Current Source And Detector", TRW Docket No. 20-0080, having inventor Stuart G. Downs; filed on the same date as this application. This application is incorporated herein by reference in its entirety.

BACKGROUND OF THE INVENTION

1. Field of the Invention

The present invention relates generally to vehicle steering wheels. More particularly, the present invention relates to an improved technique that employs distinguishing tones to pass electronic information between a steering wheel electronics assembly and a vehicle system.

2. Discussion of the Related Art

In the automotive industry, steering wheels commonly provide drivers with a number of automotive controls such as cruise control, braking, flashing front lights, and flashing rear lights that are operated by electronic push buttons located on the vehicle steering wheel. These push buttons generate electronic information to be used by the vehicle when performing the various automotive functions. Current techniques pass the electronic information from a steering wheel electronics assembly to an electronic control box, located under the dashboard or elsewhere in the vehicle. The steering wheel electronics assembly is generally located in the center of the steering wheel and can have the various electronic push buttons and lights mounted on it to operate these vehicle systems. The rotary motion of the steering wheel in relation to the steering wheel column typically requires the placement of one or more sliding contacts in the column in order to pass the electronic information from the steering wheel to the electronic control box. Typically, the steering wheel electronics assembly uses a time bit sequence of information and signal magnitude to convey to the electronic control box which particular button was pushed. In turn, the electronic control box decodes the electronic information and activates the appropriate automotive circuit within the vehicle. This circuit technique is fairly complex and difficult to maintain particularly due to the bit sequencing algorithms and circuitry required.

Another significant problem with this circuit technique for transmitting signals from a vehicle steering wheel to a vehicle system concerns the contact resistance of the sliding contacts. The sliding elements of the sliding contacts are typically spring loaded and very prone to oxidation and other causes of surface degradation. If the electrical resistance between the sliding elements of a contact is too large, there will be an increased voltage drop across the sliding elements which decreases the overall system noise margin. The result is that the electronic control box cannot effectively interpret the signal magnitude, and the system will either fail to operate or operate intermittently. This failure to operate properly is a source of great frustration to the driver, reduces system reliability, and causes numerous and costly repairs. Thus, there is a need to combat the problem created by high contact resistance of sliding contacts without increasing the cost of overall system operation.

SUMMARY OF THE INVENTION

The steering wheel control system of the present invention uses a high impedance AC circuit for passing electronic information between a steering wheel push-button and a vehicle system that is not dependant upon contact resistance. The system passes electronic information between the steering wheel push-button and the corresponding vehicle system by generating a tone assigned to the electronic information, transmitting the tone from the steering wheel to the vehicle system via an AC signal superimposed on a DC source, and decoding the transmitted tone.

A given tone corresponds to the particular button being pushed and allows the electronic information to be passed via discrete frequencies rather than as a function of signal magnitudes. An electronic control box can then simply look for the presence of particular frequencies rather than the typical time bit sequence of information at a minimum required magnitude. The present invention also uses a much simpler circuit than is currently in use because of the off-the-shelf nature of tone generation and decoding components. Furthermore, the present invention allows for the continued use of current sliding contacts. It should also be appreciated that the same principles can be applied to passing electronic information from the vehicle systems to the steering wheel.

Further objects, features and advantages of the invention will become apparent from a consideration of the following description and the appended claims when taken in connection with the accompanying drawings.

DETAILED DESCRIPTION OF THE PREFERRED EMBODIMENTS

Figure 1:
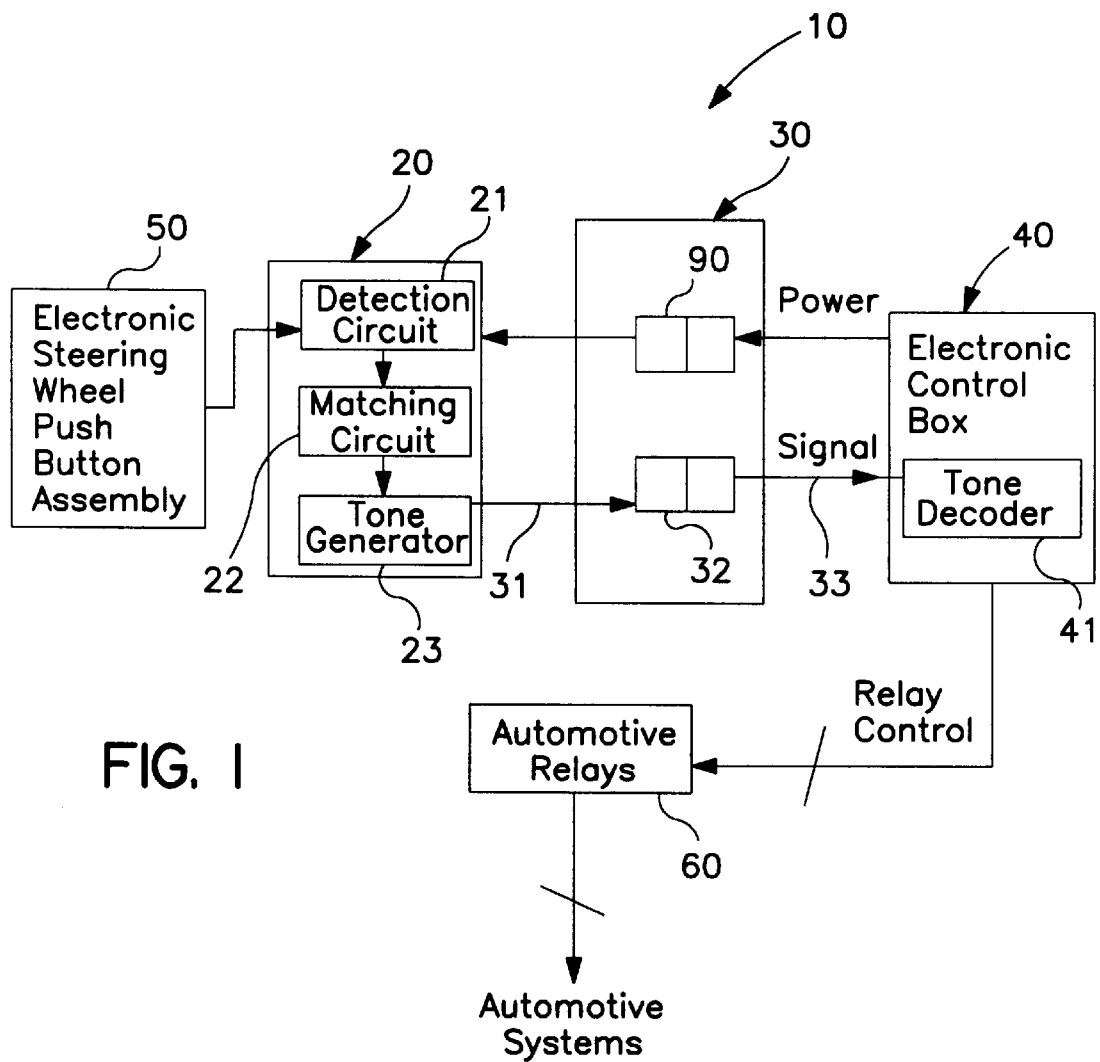
FIG. 1 is a functional schematic block diagram of a steering wheel control system of the present invention.

The following discussion of the preferred embodiments directed to a steering wheel electronics assembly that generates a tone indicative of a vehicle function is merely exemplary in nature, and is in no way intended to limit the invention or its applications or uses.

Turning now to FIG. 1, a steering wheel control system, indicated generally at 10, according to the invention, includes a steering wheel electronics assembly 20, a signal transmission assembly 30, and an electronic control box 40, for passing electronic information from a steering wheel push button assembly to the corresponding electrical system within the vehicle. The push button assembly 50 includes a plurality of electrical switches, generally push button switches, that are used to operate various vehicle systems, such as the vehicle cruise control systems, emergency flashers, etc. The present invention is intended to provide an improved technique for transmitting the electrical information from the particular push button switch to activate the corresponding vehicle system, and is thus used for an existing or contemplated vehicle system control on a vehicle steering wheel column. The electronics assembly 20 is electrically connected to the steering wheel push button assembly 50, the signal transmission assembly 30 is electrically connected to the electronics assembly 20, the electronic control box 40 is electrically connected to the signal transmission assembly 30, and the electronic control box 40, preferably located under the dash, is electrically connected to the particular vehicle system through a bank of relays 60.

The electronics assembly 20 includes a detection circuit 21, a matching circuit 22, and a tone generator 23. The signal transmission assembly 30 includes a steering wheel signal medium 31 connected to the electronics assembly 20, a sliding contact 32 connected to the steering wheel signal medium 31, and a vehicle signal medium 33 connected to the sliding contact 32. The signal mediums 31 and 33 are preferably standard signal wires, but can also comprise other signal mediums such as optical fibers. It should be noted that typically the steering wheel column will also have a power sliding contact 90, but contact resistance is not as much of a problem there due to the increased signal strength. Finally, the electronic control box 40 includes a tone decoder 41.

In operation, the electronics assembly 20 produces a tone which is preferably an audio-frequency AC signal corresponding to electronic information superimposed on a DC source. The detection circuit 21 detects the electronic information of which button was pressed on the steering wheel push button assembly 50, the matching circuit 22 matches the electronic information to the tone, and the tone generator 23 produces the tone. For example, the electronic information could be the push-button command for acceleration during cruise control operation. The acceleration command will have a corresponding tone which can be maintained in an information table containing information and tone pairings for all of the applicable vehicle systems. Comparing the electronic information to the information table therefore allows the electronics assembly 20 to select the proper tone to generate. Each of the detection circuits 21, the matching circuit 22 and the tone generator 23 can be well known electrical circuits that will operate according to the discussion herein. The signal transmission assembly 30 then transmits the tone from the electronics assembly 20 to the selected vehicle system. The tone passes from the electronics assembly 20 through the steering wheel signal medium 31, through the sliding contact 32, through the vehicle signal medium 33, and to the electronic control box 40. The electronic control box 40 decodes the transmitted tone by using the tone decoder 41 to match the tone to the electronic information. The tone detector 41 can also be any well-known electrical tone detector that operates according to the discussion herein. Similarly to the matching circuit 22, the tone decoder 41 compares the tone to a tone table containing information and tone pairings, and selects the electronic information corresponding to the tone. The electronic control box 40 decodes the tone generated by the tone generator 23, and based on the decoded tone signal, activates one of the bank of automotive relays 60 to activate the particular automotive system corresponding to the activated push button in the push button assembly 50.

The present invention therefore allows effective signal transmission in cases where the sliding contact 32 has a contact resistance as high as approximately 10–50 ohms, whereas existing methods encounter transmission problems above approximately 1 to 10 ohms.

It is to be understood that the invention is not limited to the exact construction illustrated and described above, but that various changes and modifications may be made without departing from the spirit and scope of the invention as defined in the following claims.

What is claimed is:

1. A method for passing electronic information between a steering wheel and a vehicle system, said method comprising the steps of:
    generating a tone corresponding to the electronic information;
    transmitting the tone from the steering wheel to a tone decoder that decodes the transmitted tone; and
    sending the decoded tone to the vehicle system.

2. The method of claim 1 wherein the step of generating the tone comprises the steps of:
    detecting the electronic information;
    matching the electronic information to a tone selected from a plurality of available tones; and
    producing the tone.

3. The method of claim 2 wherein the matching step comprises the steps of:
    comparing the electronic information to an information table containing information and tone pairings; and
    selecting the tone corresponding to the electronic information.

4. The method of claim 1 wherein the step of transmitting the tone comprises the steps of:
    passing the tone from the steering wheel through a steering wheel signal medium;
    passing the tone from the steering wheel signal medium through a sliding contact;
    passing the tone from the sliding contact through a vehicle signal medium; and
    passing the tone from the vehicle signal medium to the tone decoder.

5. The method of claim 1 wherein the step of decoding the transmitted tone comprises the step of matching the tone to the electronic information.

6. The method of claim 5 wherein the matching step comprises:
    comparing the tone to a tone table containing information and tone pairings; and
    selecting the electronic information corresponding to the tone.

7. The method of claim 1 wherein the tone comprises an audio-frequency AC signal superimposed on a DC source.

8. A steering wheel control system for passing electronic information from a steering wheel to a vehicle system, said control system comprising:
    a steering wheel electronics assembly connected to the steering wheel for generating a tone corresponding to the electronic information;
    a signal transmission assembly connected to the steering wheel electronics assembly for transmitting the tone from the steering wheel electronics assembly; and
    an electronic control box responsive to the transmitted tone from the signal transmission assembly, said control box being connected to the signal transmission assembly and to the vehicle system, said control box decoding the transmitted tone and sending the decoded tone to the vehicle system.

9. The steering wheel control system of claim 8 wherein the steering wheel electronics assembly comprises:
    a detection circuit for detecting the electronic information from the steering wheel;
    a matching circuit for matching the electronic information to the tone; and
    a tone generator for producing the tone.

10. The steering wheel control system of claim 8 wherein the signal transmission assembly comprises:
    a steering wheel signal medium connected to the steering wheel electronics assembly;
    a sliding contact connected to the steering wheel signal medium; and
    a vehicle signal medium connected to the sliding contact and to the electronic control box such that the tone passes from the steering wheel electronics assembly through the steering wheel signal medium, through the sliding contact, through the vehicle signal medium, and to the electronic control box.

11. The steering wheel control system of claim 10 wherein the steering wheel signal medium and the vehicle signal medium comprise a signal wire.

12. The steering wheel control system of claim 10 wherein the steering wheel signal medium and the vehicle signal medium comprise optical fibers.

13. The steering wheel control system of claim 10 wherein the sliding contact has a contact resistance between approximately 10 and 50 ohms.

14. The steering wheel control system of claim 8 wherein the electronic control box comprises a tone decoder for matching the tone to the electronic information.

15. The steering wheel control system of claim 8 wherein the tone comprises an audio-frequency AC signal superimposed on a DC source.

16. The steering wheel control system of claim 8 wherein the steering wheel electronics assembly further includes an information table that includes information about a plurality of tones assigned to a plurality of steering wheel push buttons.

17. A steering wheel control system for operating a vehicle system, said control system comprising:

a steering wheel electronics assembly that generates a tone in response to a selected steering wheel push button on a vehicle steering wheel, wherein a distinct tone corresponds to each of a plurality of steering wheel push-buttons, said electronics assembly including a detection circuit for detecting an electrical signal from the selected steering wheel push-button, a matching circuit for matching the electrical signal from the selected push-button to the generated tone, and a tone generator for producing the tone;

a signal transmission assembly connected to the steering wheel electronics assembly for transmitting the generated tone from the steering wheel electronics assembly, said steering wheel electronics assembly including a sliding contact connected to the tone generator; and an electronic control box including a tone decoder, said tone decoder connected to the sliding contact and decoding the tone back to the electrical signal to operate the vehicle system.

18. The control system according to claim 17 wherein the sliding contact has a contact resistance between approximately 10 and 50 ohms.

19. The control system according to claim 17 wherein the generated tone is an audio-frequency AC signal superimposed on a DC source.

20. The control system according to claim 17 wherein the steering electronic assembly includes an information table that includes information concerning which tone is assigned to which steering wheel push button.

* * * * *